(12) United States Patent
Waltz (10) Patent No.: US 6,599,167 B2
(45) Date of Patent: Jul. 29, 2003

(54) GAME CALL HOLDER AND AMPLIFYING DEVICE

(76) Inventor: Glenn Waltz, 866 Hwy. 65, Roberts, WI (US) 54023

( * ) Notice: Subject to any disclaimer, the term of this patent is extended or adjusted under 35 U.S.C. 154(b) by 291 days.

(21) Appl. No.: 09/773,745

(22) Filed: Feb. 2, 2001

(65) Prior Publication Data

US 2003/0060120 A1 Mar. 27, 2003

Related U.S. Application Data

(60) Provisional application No. 60/235,594, filed on Sep. 27, 2000.

(51) Int. Cl.[7] .................................................. A63H 5/00
(52) U.S. Cl. ........................ 446/397; 446/404; 446/213; 43/1; 43/2; 84/402
(58) Field of Search ................................ 446/176, 180, 446/397, 418, 213, 404; 224/240, 222; 43/1, 2; 84/402, 410, 408

(56) References Cited

U.S. PATENT DOCUMENTS 5,244,430 A * 9/1993 Legursky .................... 446/397
5,503,585 A * 4/1996 Heineman .................. 446/397
5,607,091 A * 3/1997 Musacchia .................. 224/222
5,988,469 A * 11/1999 Musacchia .................. 224/267
6,308,876 B1 * 10/2001 Havens ....................... 224/661

* cited by examiner

Primary Examiner—Jacob K. Ackun
Assistant Examiner—Jamila Williams
(74) Attorney, Agent, or Firm—Tipton L. Randall (57) ABSTRACT

A game call amplifying call holder device includes a concave member and upward sloping sides. A pair of parallel rail members within the concave member are elevated a selected distance by pairs of spaced apart support members. Each rail member has a retaining flange member extending along its length on a top side, and a biasing member extending along its length adjacent to and beneath the retaining flange member. A stop member and a bridge member are connected between adjacent ends of the parallel rail members opposite each other. The rail members reversibly secure at least one planar call device there between, with the planar circular call device secured on opposite edges between the flange member and the biasing member of each rail member. The flange members and biasing members allowing the planar call device to vibrate when activated by a striker, with the concave member amplifying vibrations thus produced.

23 Claims, 11 Drawing Sheets

GAME CALL HOLDER AND AMPLIFYING DEVICE

CROSS-REFERENCE TO RELATED APPLICATIONS, IF ANY

This application claims the benefit under 35 U.S.C. §119 (e) of co-pending provisional application Ser. No. 60/235,594, filed Sep. 27, 2000. Application Ser. No. 60/235,594 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a device for holding a game call and amplifying the audio output of the game call. More particularly, the device allows the user to operate the game call with one hand.

2. Background Information

There are many methods of employing a game call device for attracting wild game to a hunter. Most often the game call device imitates the vocal sounds produced by the particular game animal the hunter is pursuing. Duck and goose hunters often imitate the vocal sounds of these birds in order to attract them into range for firing a weapon at them. Other calls might imitate the call of wounded prey, such as a rabbit, to attract fox, coyote, or wolf.

The recent introduction of American wild turkey into the wild has provided sport hunting of this species. Wild turkey are quite vigilant in their habits and for a hunter to approach a turkey sufficiently close to fire a weapon requires great skill. The more common approach is to imitate the vocal call of one or more female turkeys (hens) in order to attract the male (cock). Numerous turkey calls have been developed for the purpose of attracting the male to the hunter in order to fire at the bird.

One of the most popular turkey calls is the so-called slate call, which is a planar circular piece of slate mounted in a circular holder made of plastic. The holder has an open side that exposes the slate and a closed side with holes where the call is emitted. Normally, the hunter holds the slate call in the palm of one hand and scrapes a wooden or metal striker rod against the exposed slate surface to produce the call of a hen turkey. When the male turkey approaches, the hunter must set down the call and striker, and then pick up a weapon to fire at the turkey. These movements on the part of the hunter often warn the turkey of danger, and the birds quickly flee.

Individual hunters who may have the use of only one hand are presented with great difficulties in operating the above described turkey slate call and then firing at a turkey that has been called in by the hunter. The applicant has devised a call holder device that can be operated with one hand (or two hands), with the call holder device adapted for containing one, two or more slate turkey calls. In addition, further attachments are disclosed that enable the one handed hunter to conveniently and expertly operate the turkey call.

SUMMARY OF THE INVENTION

The invention is directed to a game call amplifying call holder device. The device includes a concave, rectangular member with an interior surface and an exterior surface, the interior surface including a planar base surface and upward sloping sides. A pair of parallel rail members are positioned within the concave member, with each rail member elevated a selected distance above the planar base surface by a pair of spaced apart support members. Each rail member has a retaining flange member extending along the rail member length on a top side, and a biasing member extending along each rail member length adjacent to and beneath the retaining flange member. A stop member is connected between adjacent ends of the parallel rail members, and a bridge member is connected between adjacent ends of the parallel rail members opposite the stop member. The rail members with flange member and biasing member are positioned and adapted to reversibly secure at least one planar call device there between, with the planar call device secured on opposite edges between the flange member and the biasing member of each rail member. The planar call device is inserted between the parallel rail members from an end opposite the stop member, with the flange members and biasing members allowing the planar call device to vibrate when activated with a striker, with the concave member amplifying vibrations thus produced.

DESCRIPTION OF THE PREFERRED EMBODIMENTS

Nomenclature

10 Call Holder Device
20 Concave Member
25 Interior Surface of Concave Member
30 Exterior Surface of Concave Member
35 Planar Base Surface
40 Upward Sloping Side Surface
50 Parallel Rail Members 55 Rail Support Members
60 Retaining Flange Member
65 Biasing Member
70 Stop Member
75 Bridge Member
80 Planar Call Device
85 Support Clip Member
90 Attachment End Portion of Clip Member
95 First Blade Member of Support Clip
97 Second Blade Member of Support Clip
100 Attachment Pouch Member
105 Closed End of Pouch Member
110 Open End of Pouch Member
115 Strap Member
120 Strap Member
125 Belt Attachment Strap Member
130 Aperture in Strap Member
135 Call Holder Pocket
150 Striker Holder Member
155 Open End of Striker Holder
160 Closed Finger End of Striker Holder
165 Finger End Members
170 Striker Device
200 Aperture in Concave Member Construction Referring to FIGS. 1–5, one embodiment of the game call amplifying call holder device 10 of the present invention is shown. The amplifier call holder device 10 is particularly well suited for use with turkey calls, although other game calls can be used with the holder device 10 with comparable results. The amplifying call holder device 10 includes a concave, rectangular member 20 with an interior surface 25 and an exterior surface 30. The interior surface 25 includes a planar base surface 35 and upward sloping sides 40. A pair of parallel rail members 50 are positioned within the concave member 20, with each rail member 50 elevated a selected distance above the planar base surface 35 by a pair of spaced apart support members 55. The parallel rail members 50 may be parallel to the planar base surface 35 of the concave member 20, or the rail members 50 may slope from one end to the other, or from side to side, by having support members 55 of different lengths. Each rail member 55 has a retaining flange member 60 extending along the rail member length on a top side, and a biasing member 65 extending along each rail member length adjacent to and beneath the retaining flange member 60. A stop member 70 is connected between adjacent ends of the parallel rail members 50, and at least one bridge member 75 is connected between adjacent ends of the parallel rail members 50 opposite the stop member 70.

Figure 2:
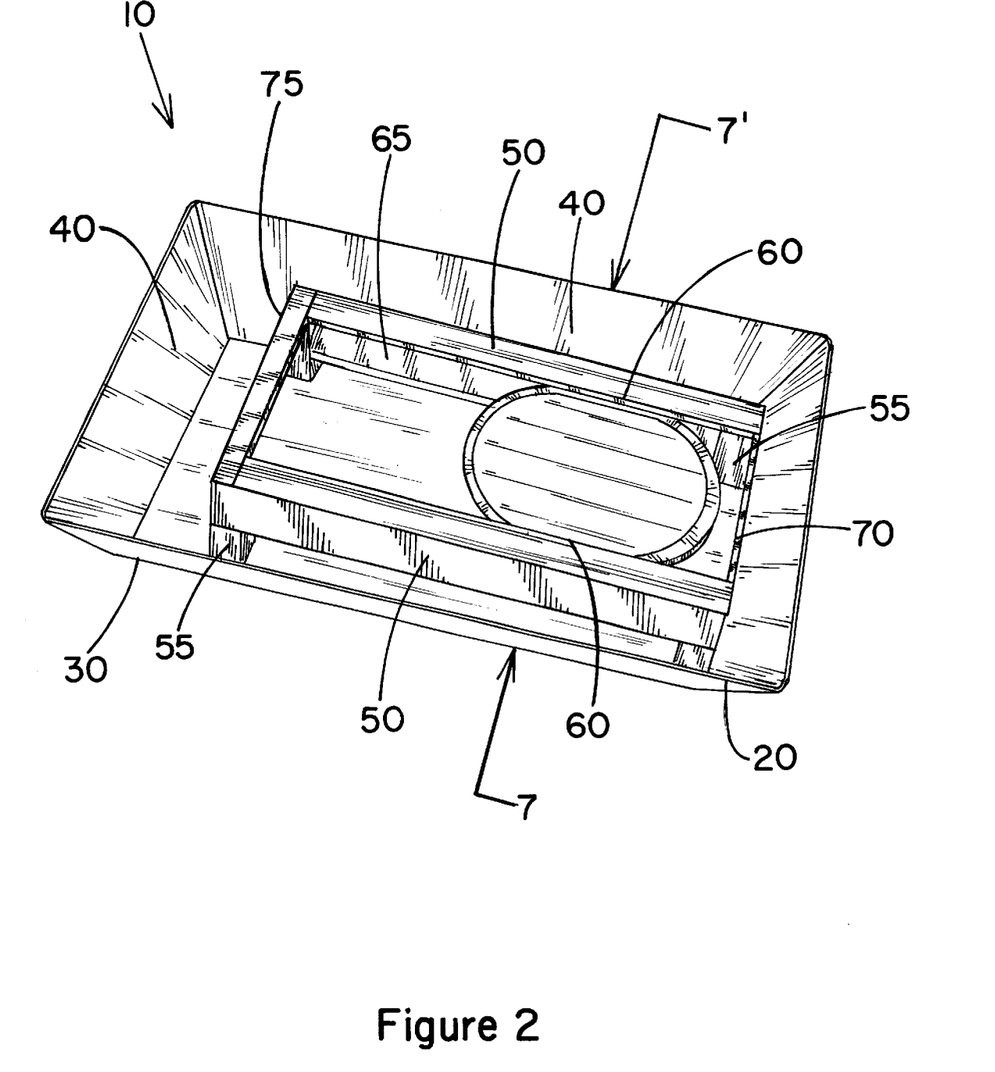
FIG. 2 is a perspective elevational view of the amplifying call holder device of the present invention holding a circular slate call.
Figure 3:
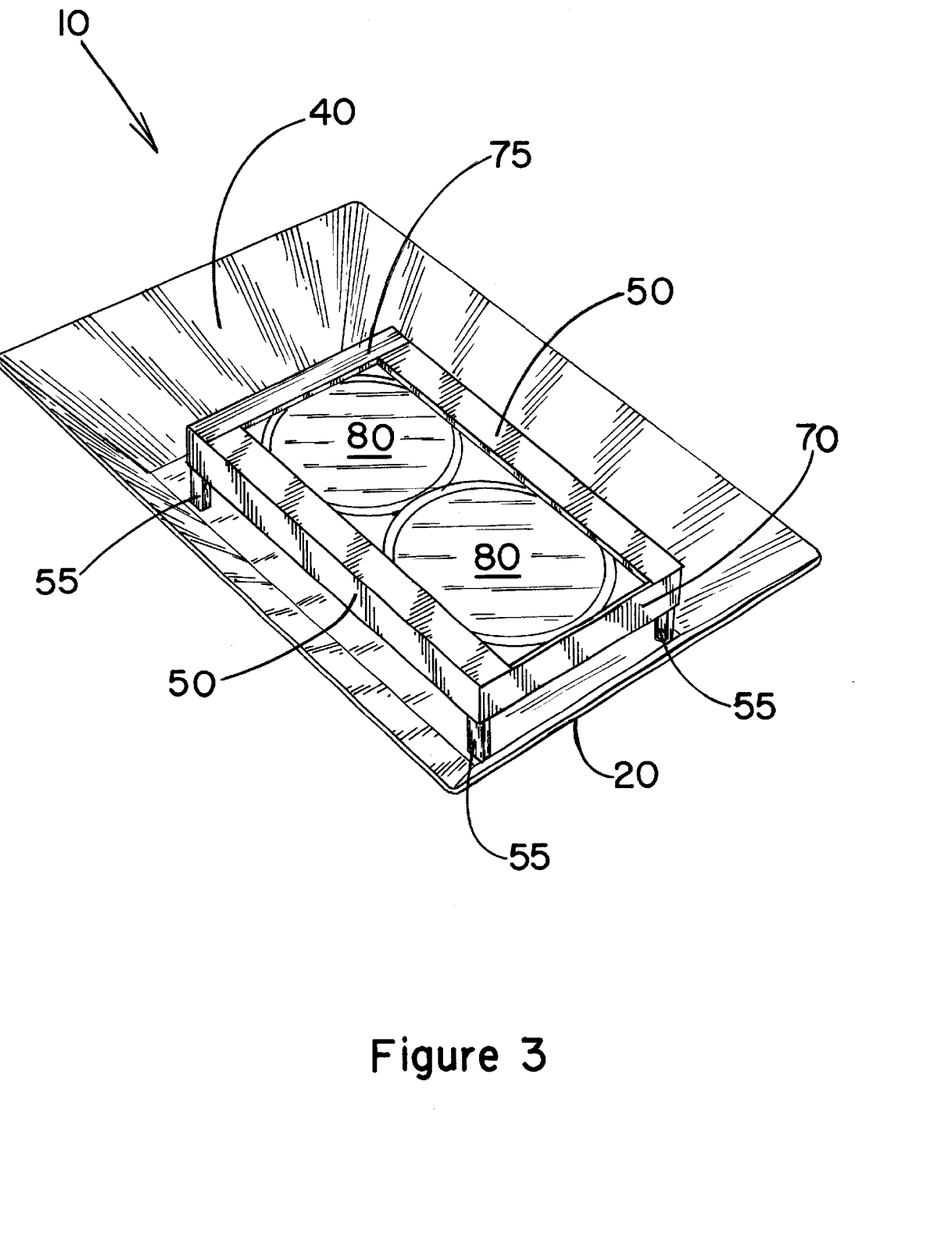
FIG. 3 is a perspective elevational view of the amplifying call holder device of the present invention holding two circular slate calls.
Figure 7:
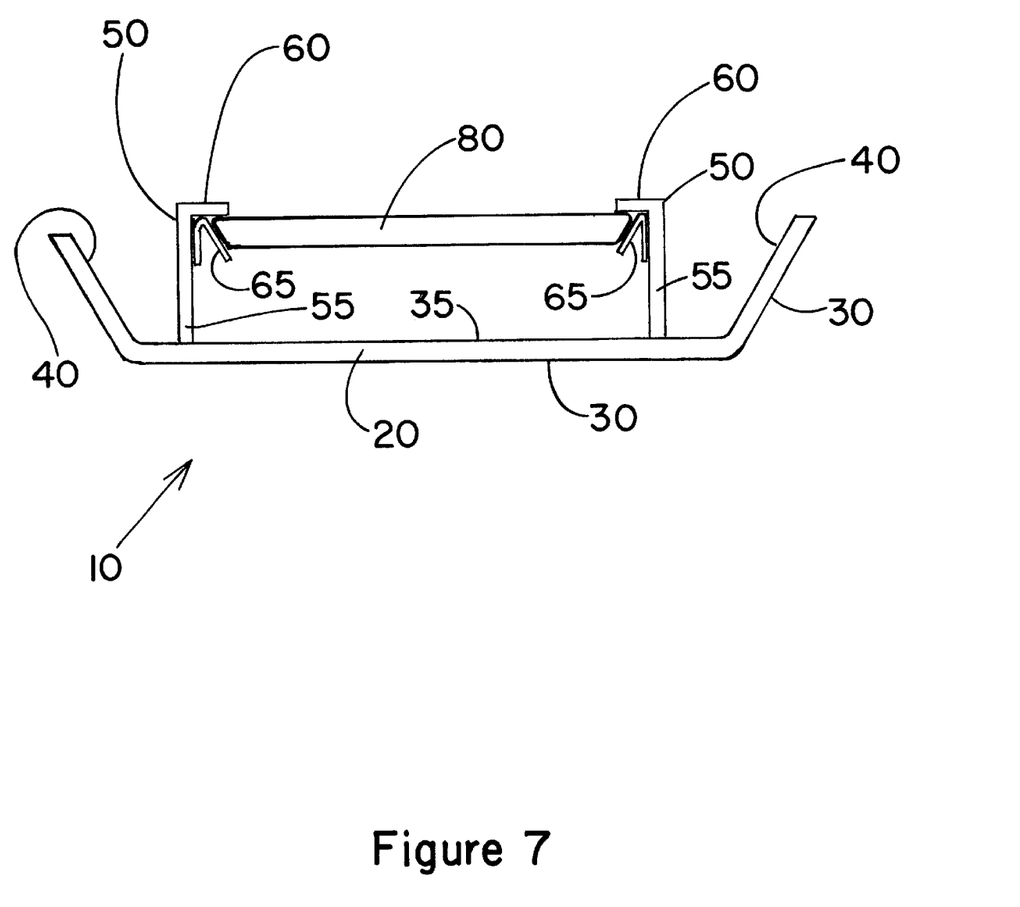
FIG. 7 is a cross sectional view along line 7–7' of FIG. 2.

The rail members 50 with flange member 60 and biasing member 65 are positioned and adapted to reversibly secure at least one planar call device 80 there between, with the planar call device 80 secured on opposite edges between the flange member 60 and the biasing member 65 of each rail member 50, as shown in FIGS. 2 and 3. Although the planar call device 80 is shown as a circular call device, other shapes including squares, rectangles, ovals, etc. for the call device, are contemplated. The rail members 50 are of sufficient length that two different planar call devices 80 can be accommodated in the holder device 10, as seen in FIG. 3. The planar call device 80 is inserted between the parallel rail members 50 from an end opposite the stop member 70, with the flange members 60 and biasing members 65 allowing the planar call device 80 to vibrate when activated with a striker device 170, with the concave member 20 reflecting and amplifying vibrations thus produced. Thus, the hunter can operate the game call with one hand using the striker 170, without needing the other hand to hold the game call device 80. FIG. 7 shows a cross sectional view along line 7–7' of FIG. 2, where the holder device 10 supports the planar call device 80 therein. The biasing member 65 is preferably a linear inverted V-shaped member secured to the rail member 50 beneath the retaining flange member 60, with the point of the V adjacent the flange member 60. The biasing member 65 flexes sufficiently to allow insertion of the planar call device 80 between the biasing member 65 and the retaining flange member 60. As the hunter rubs the striker device 170 across the exposed surface of the planar call device 80, the biasing member 65 allows the call device 80 to vibrate to produce the audio response that is then reflected and amplified by the concave member 20.

Figure 4:
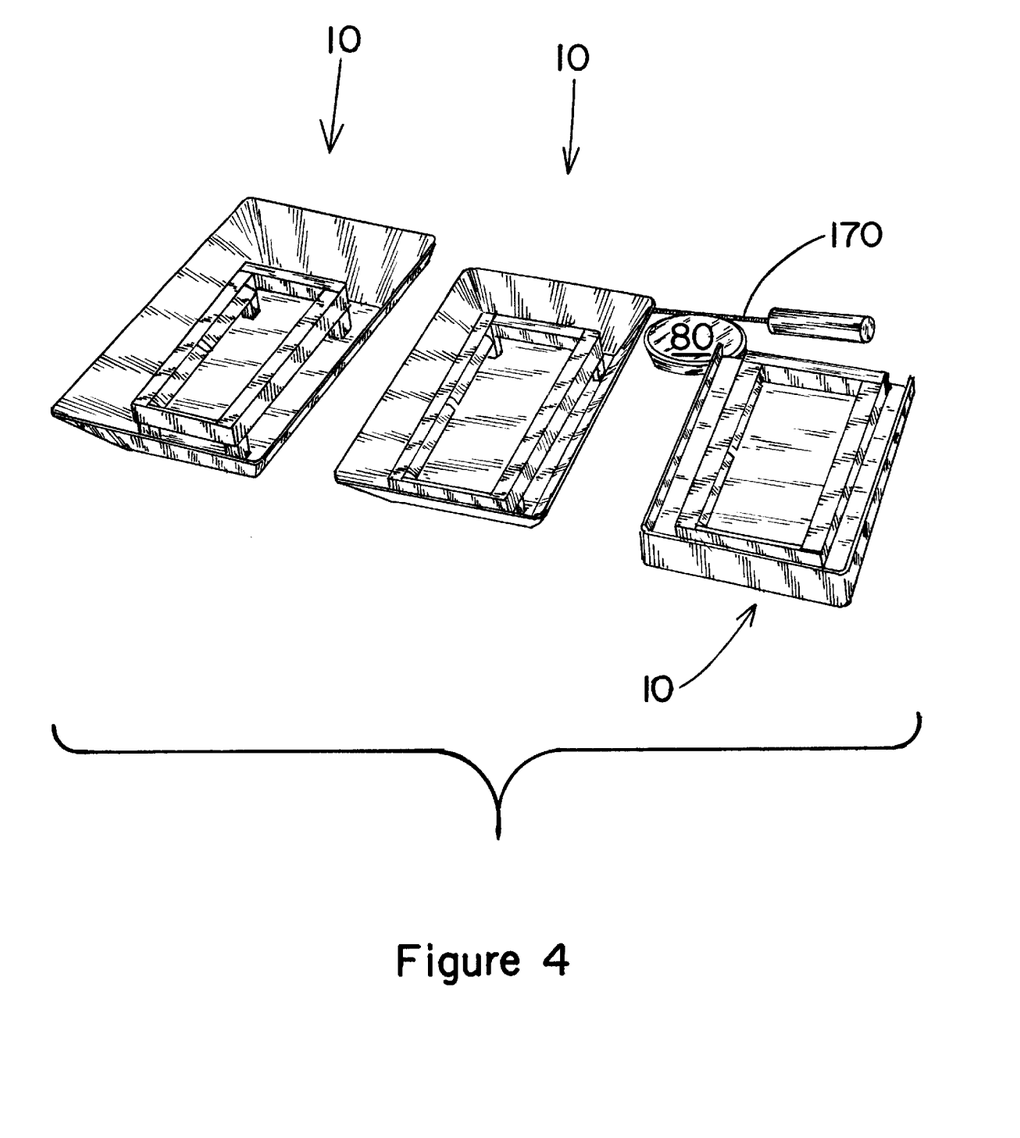
FIG. 4 is a perspective elevational view of three amplifying call holder devices of varying size of the present invention.

The amplifying call holder device 10 of the present invention can be fabricated from metal or synthetic polymeric material such as acrylic plastic. It is preferred that the device 10 be made from synthetic polymeric material for ease in forming the concave, rectangular member 20 that serves to reflect and amplify the audio output of the planar call device 80. The V-shaped biasing member 65 is preferably fabricated from metal, such as steel, and is of a thickness to flex slightly to hold the call device 80 against the retaining flange member 60 of each rail member 55. The amplifying call holder device 10 of the present invention can be fabricated in various sizes as shown in FIG. 4. A planar call device 80 is shown for size comparison. The call holder device 10 is shown with a camouflage finish to prevent alerting the quarry to the hunter's presence.

Figure 5:
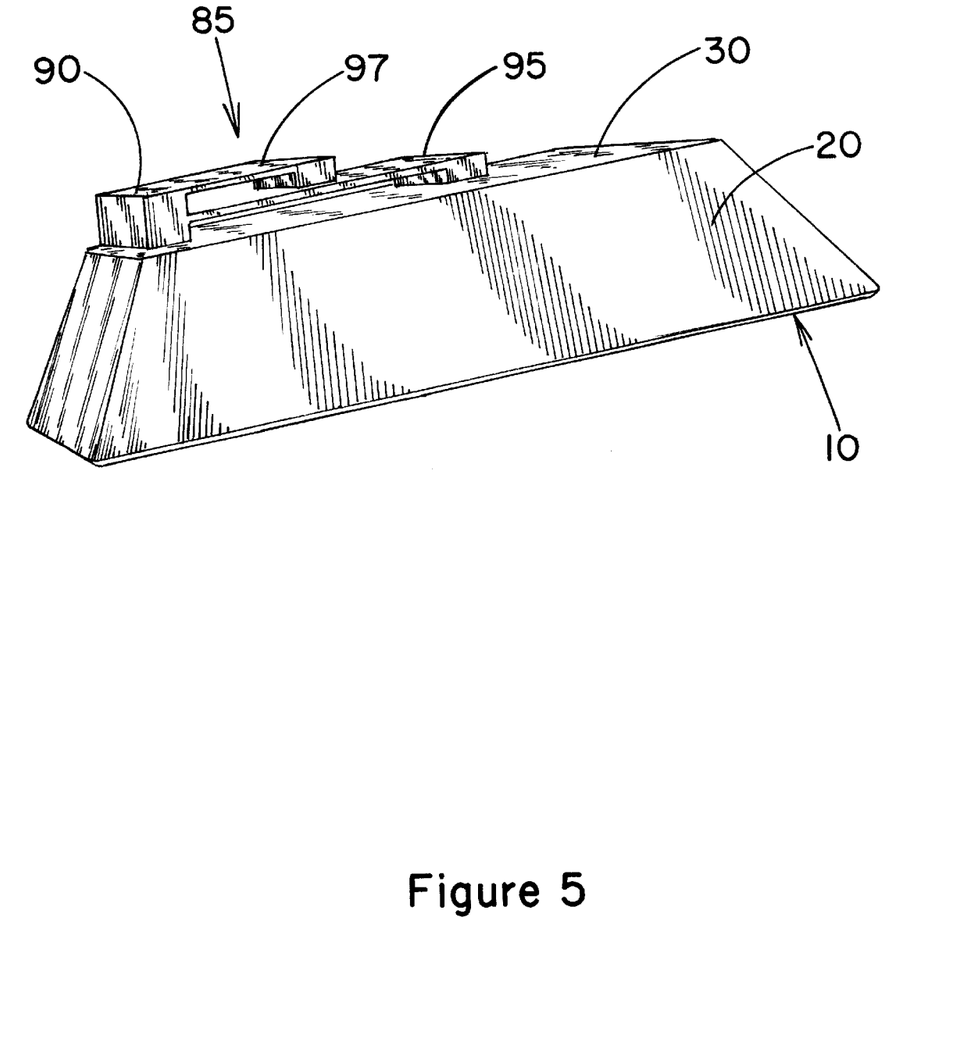
FIG. 5 is a perspective elevational view of the back side of the amplifying call holder device of the present invention.

Referring to FIG. 5, a further embodiment of the present invention is shown. The amplifying call holder device 10 may include a support clip member 85 secured to the exterior surface 30 of the concave member 20 toward one end thereof The support clip member 85 includes an anchoring attachment end 90 secured to the exterior surface 30 of the concave member 20, with a first blade member 95 and a second blade member 97 extending from the anchoring attachment end portion 90 along the exterior surface 30 of the concave member. The two blade members 95, 97 are positioned in register with each other and with the first blade member 95, adjacent the concave member outer surface 30, longer than the second blade member 97, and opposite the concave member outer surface 30. The support clip member 85 is used to secure the call holder device 10 to an attachment pouch member 100, shown in FIGS. 8 and 9, and described in detail later.

Figure 1:
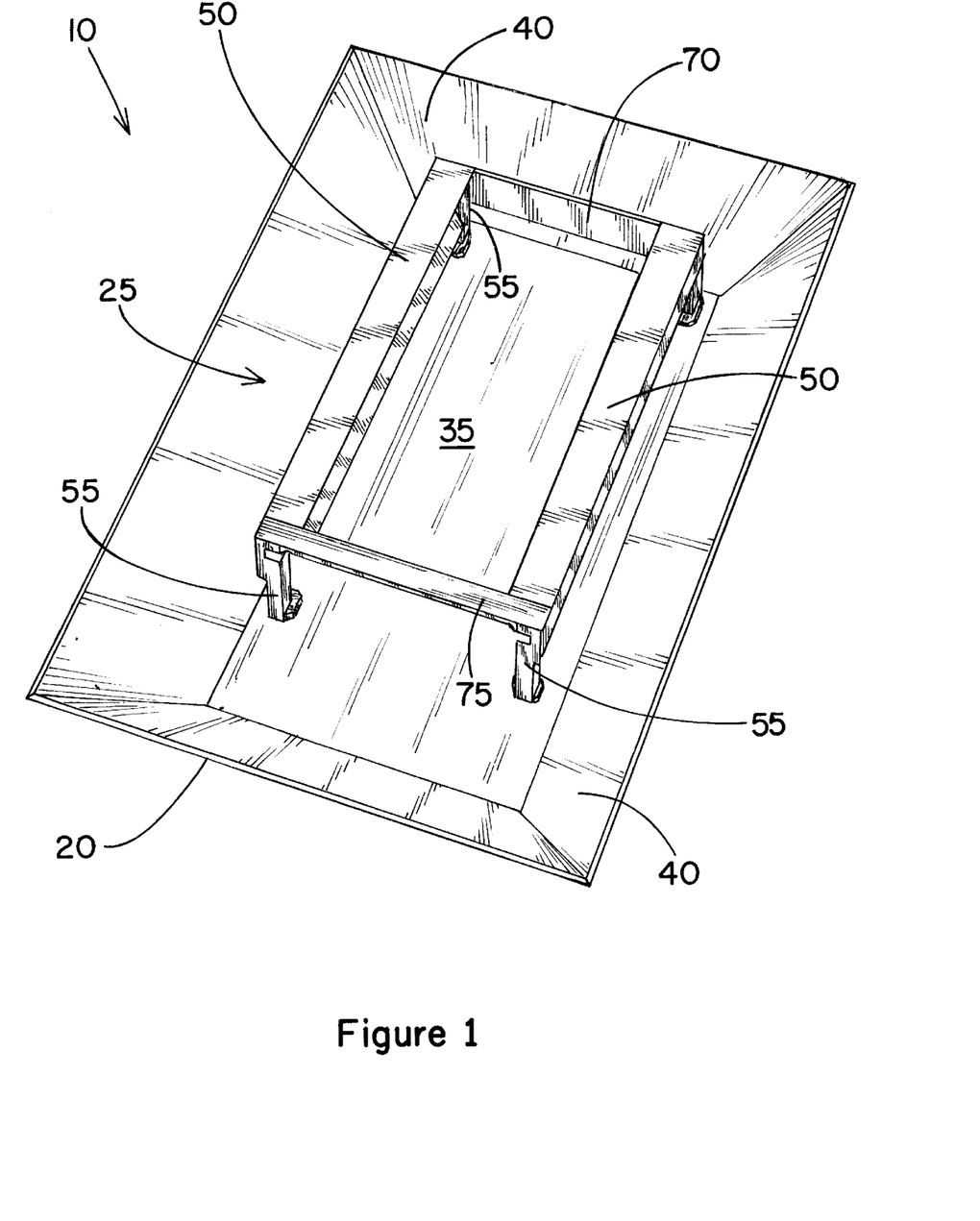
FIG. 1 is a perspective elevational view of one embodiment of the amplifying call holder device of the present invention.
Figure 6:
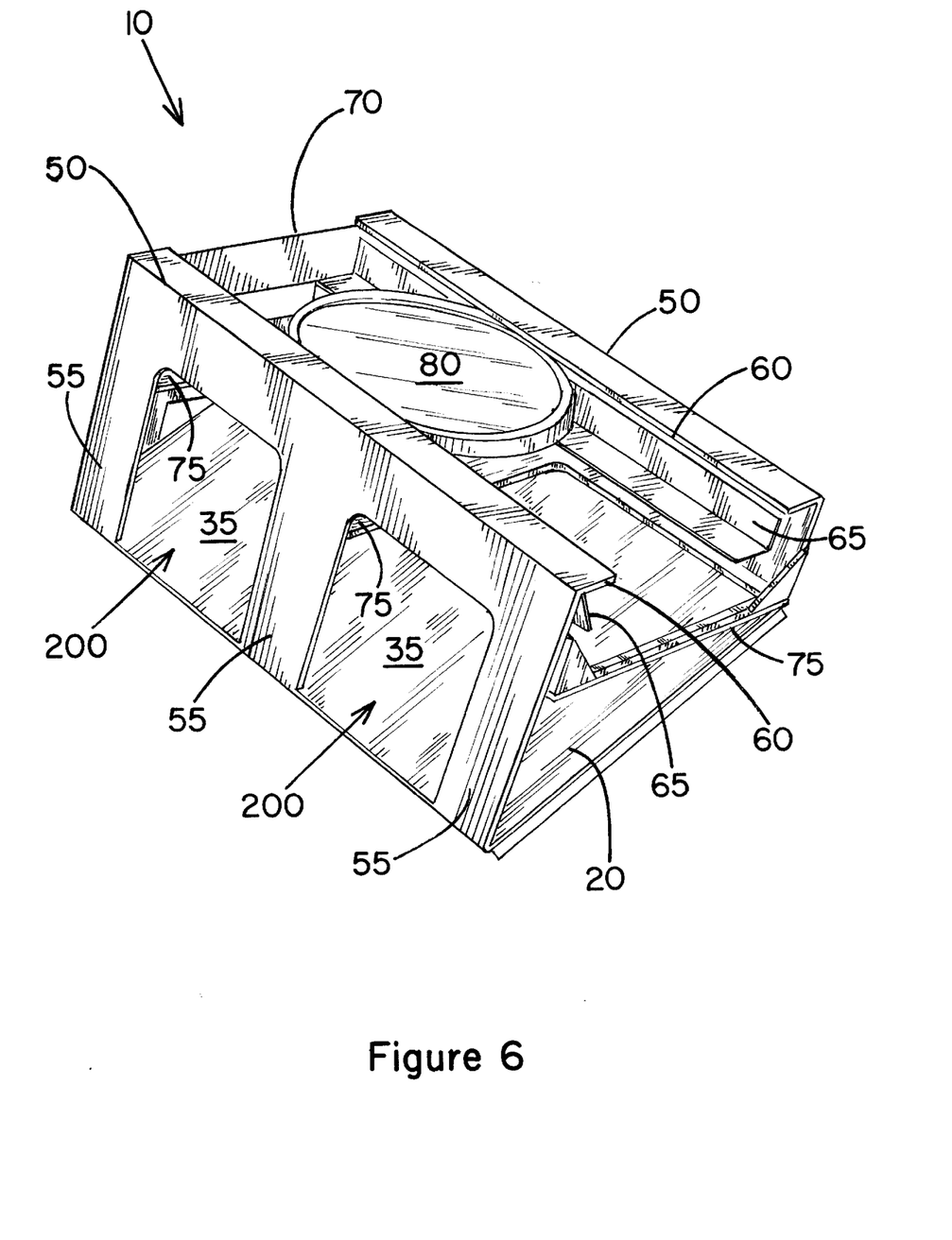
FIG. 6 is a perspective elevational view of another embodiment of the amplifying call holder device of the present invention holding a circular slate call.

An alternative embodiment of the call holder device 10 invention is shown is FIG. 6. Those elements in common with the elements of FIGS. 1–3 are denoted with the same indica. The call holder device 10 of FIG. 6 includes a concave, rectangular member 20 with an interior surface 25 and an exterior surface 30. The interior surface 25 includes a planar base surface 35 and upward sloping sides 40. A pair of parallel rail members 50 are positioned within the concave member 20, with each rail member 50 elevated a selected distance above the planar base surface 35 by a pair of spaced apart support members 55. In this embodiment one pair of support members 55 is longer than the other pair, with the planar base surface 35 sloping from one rail member to the other as seen in FIG. 6. Each rail member 50 has a retaining flange member 60 extending along the rail member length on a top side and a biasing member 65 extending along each rail member length adjacent to and beneath the retaining flange member 60. A stop member 70 is connected between adjacent ends of the parallel rail members 50, and at least one bridge member 75 is connected between adjacent ends of the parallel rail members 50 opposite the stop member 70. In this embodiment the bridge members 75 number three and are evenly spaced along the parallel rail members 50 and extend between the bottom sides thereof Further, the concave member 20 in this embodiment of the invention includes one or more apertures 200 positioned around the concave member 20 to allow the audio vibrations to be reflected from the planar base surface 35 and escape the concave member 20. In the embodiment of FIG. 6, the planar base surface 35 of the concave member 20 can rest on any flat surface, such as a stump or the ground, with the parallel rail members 50 held at an angle thereto. Thus, the call device 80 and the call holder device 10 allow the hunter to activate the call device 80 with one hand.

The rail members 50 with flange member 60 and biasing member 65 are positioned and adapted to reversibly secure at least one planar call device 80 there between, with the planar call device 80 secured on opposite edges between the flange member 60 and the biasing member 65 of each rail member 50. The rail members 50 are of sufficient length that two different planar call devices 80 can be accommodated in the holder device 10, as was shown in FIG. 3. The planar call device 80 is inserted between the parallel rail members 50 from an end opposite the stop member 70, with the flange members 60 and biasing members 65 allowing the planar call device 80 to vibrate when activated with a striker 170, with the concave member 20 reflecting and amplifying vibrations thus produced.

Figure 8:
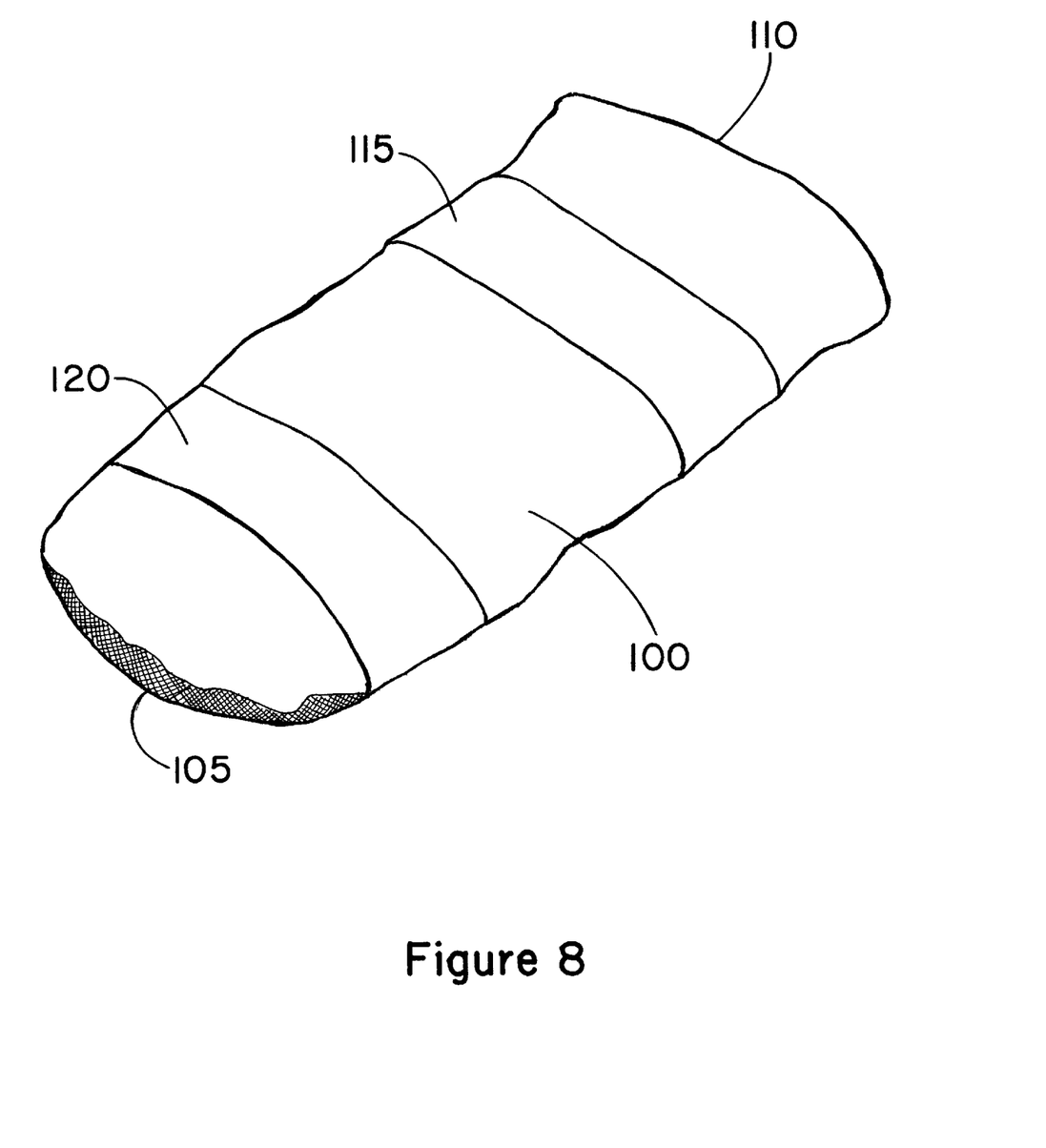
FIG. 8 is a perspective elevational view of the attachment pouch member of the present invention.
Figure 9:
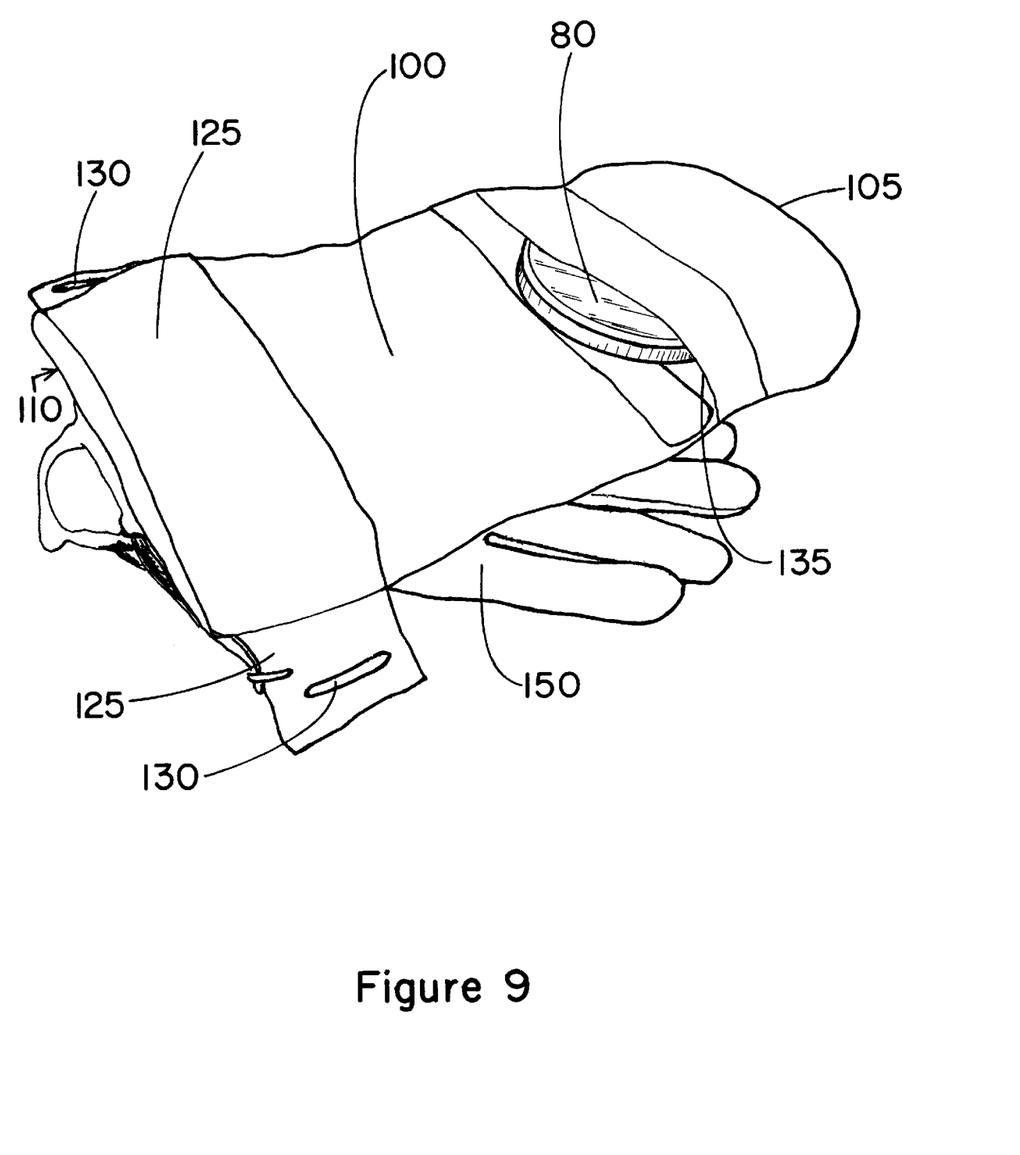
FIG. 9 is another perspective elevational view of the attachment pouch member of the present invention.

Referring to FIGS. 8 and 9, an attachment pouch member 100, having a closed end 105 and an open end 110, is shown. The pouch member 100 includes strap members 115, 120 fastened at each end to one side of the pouch member 100, with the strap members 115, 120 oriented parallel with the pouch open end 110, as seen in FIG. 8. The opposite side of the attachment pouch member 100 is shown in FIG. 9 and includes a belt attachment strap 125 secured to the pouch member 100 adjacent the open end 110. The belt attachment strap 125 includes an aperture 130 at each end thereof for attachment of the pouch member 100 to the belt of a hunter. The pouch member 100 also includes a call holder pocket 135 for accepting a planar call device 80. The pouch member 100 is preferably fabricated from fleece-lined leather and a number of planar call devices 80 can be stored therein without producing noise when the hunter wearing the pouch member 100 moves.

Once the attachment pouch member 100 is secured to the hunter's belt by the belt attachment strap member 125, the call holder device 10 is attached thereto by inserting the support clip member 85 over the edge of the open end 110 of the attachment pouch member 110. The edge of the pouch open end 110 fits between the first 95 and second 97 blade members, and the end of the second blade member 97 slips under the strap members 115, 120 fastened to the surface of the attachment pouch member 100.

Figure 10:
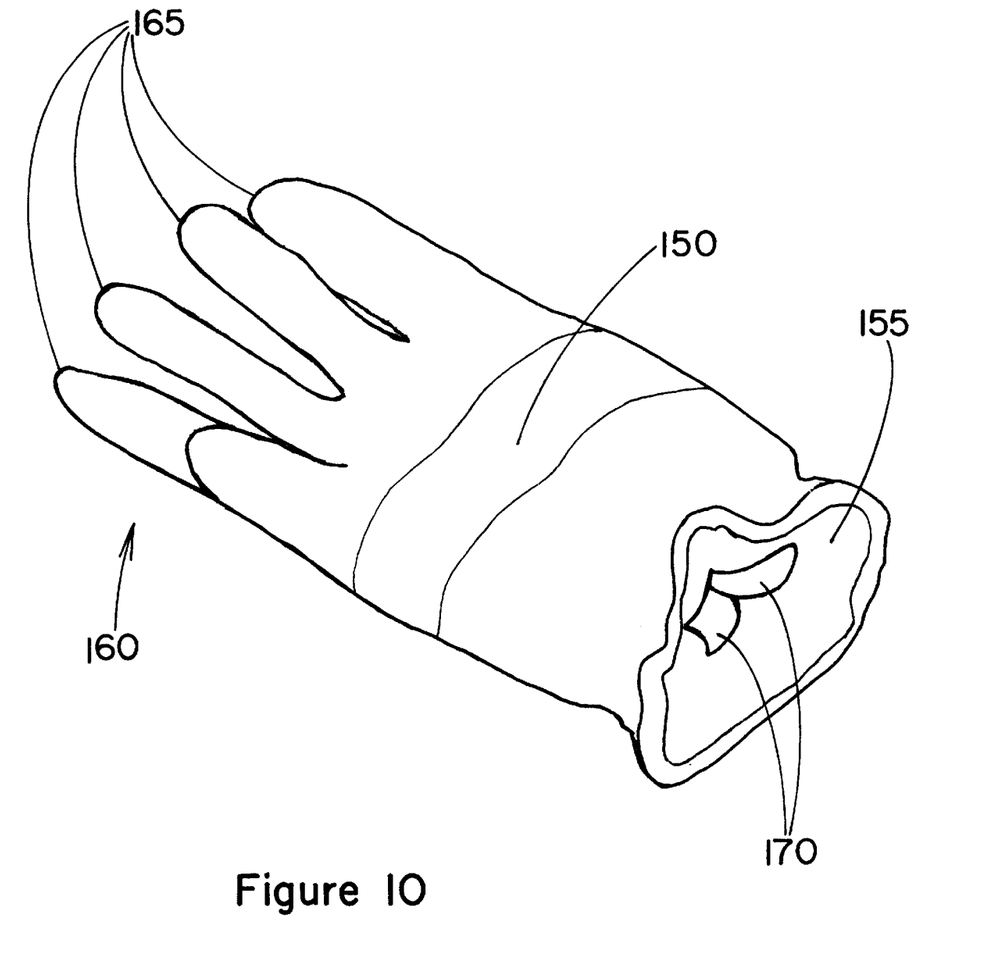
FIG. 10 is a perspective elevational view of the striker holder member of the present invention.
Figure 11:
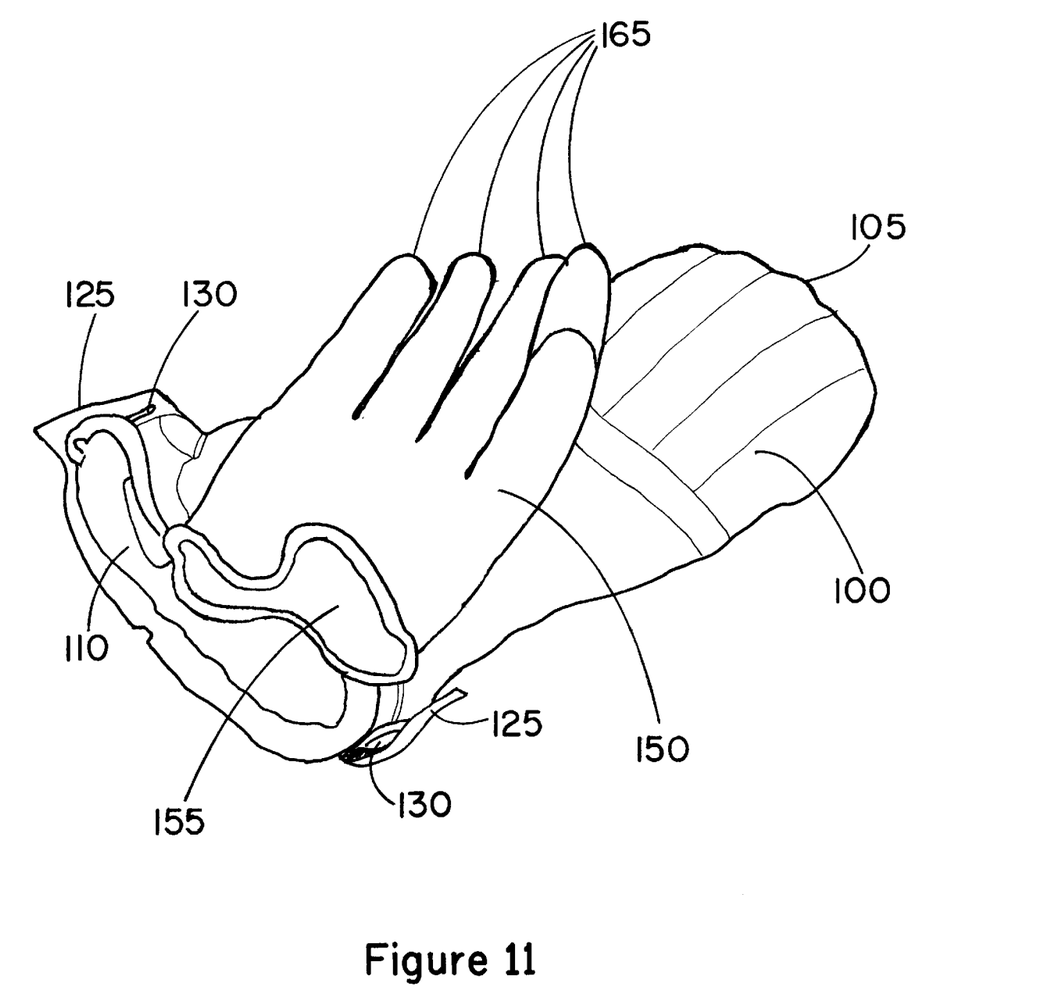
FIG. 11 is a perspective elevational view of the attachment pouch member and attached striker holder member of the present invention.

Referring to FIG. 10, in yet a further embodiment of the invention, a striker holder member 150 is attached at the open end 110 of the pouch member 100, as shown in FIG. 11. The striker holder member 150 has an open end 155 and closed finger end 160, where a single striker device 170 is inserted into each finger end 165 of the closed finger end 160. The striker holder member 150 is preferably fabricated from fleece-lined fabric with a camouflage outer finish. The fleece lining serves to hold the striker devices 170 within the holder member 150 when the hunter moves about. Thus, the hunter can attach the pouch member 100 to his belt via the attachment strap 125, then secure a call holder device 10 to the pouch member 100 via the support clip member 85, and then fasten the striker holder member 150 to the pouch member 100 for carrying a number of striker members 170. The hunter is conveniently able to select a particular striker member 170 from the striker holder member 150 and activate the call member 80 in the call holder member 10, all with one hand.

While the invention has been particularly shown and described with reference to preferred embodiments thereof, it will be understood by those skilled in the art that various changes in form and details may be made therein without departing from the spirit and scope of the invention.

I claim:

1. A game call amplifying call holder device comprising:
   a concave member with an interior surface and an exterior surface, the interior surface including a base surface and upward sloping side surface;
   a pair of parallel rail members of selected length positioned within the concave member, each rail member elevated a selected distance above the base surface by a pair of spaced apart support members attached thereto, each rail member having a retaining flange member extending along the rail member on a top side thereof;
   a biasing member extending along each rail member adjacent to and beneath the retaining flange member;
   a stop member connected between adjacent ends of the parallel rail members;
   a bridge member connected between adjacent ends of the parallel rail members opposite the stop member;
   said rail members with flange member and biasing member positioned and adapted to reversibly secure at least one planar call device there between, the planar call device secured on opposite edges between the flange member and the biasing member of each rail member, the planar call member inserted between the parallel rail members from the rail adjacent ends opposite the stop member, whereby the flange members and biasing members allows the planar call device to vibrate when activated with a striker, with the concave member reflecting and amplifying vibrations thus produced.

2. The amplifying call holder device according to claim 1 wherein, the concave member is a rectangular concave member.

3. The amplifying call holder device according to claim 1 wherein, the concave member interior surface includes a planar base surface.

4. The amplifying call holder device according to claim 1 wherein, the spaced apart support members of one rail member are of a length different than the spaced apart support members of the other rail member.

5. The amplifying call holder device according to claim 1 wherein, the retaining flange member and the biasing member of each rail member extends the selected length of the rail members.

6. The amplifying call holder device according to claim 1 wherein, the biasing member of the rail members includes a V-shaped member with a point of the V-shaped member adjacent and beneath the retaining flange member.

7. The amplifying call holder device according to claim 1 wherein, the stop member between adjacent ends of the parallel rail members is connected below the retaining flange members.

8. The amplifying call holder device according to claim 1 wherein, the bridge member between adjacent ends of the parallel rail members is connected atop the retaining flange members.

9. The amplifying call holder device according to claim 1 wherein, the rail members with flange member and biasing member are sized to accept two planar call devices.

10. The amplifying call holder device according to claim 1, further comprising a support clip member secured to the exterior surface of the concave member adjacent one end thereof.

11. The amplifying call holder device according to claim 10 wherein, the support clip member includes an anchoring attachment portion with first and second blade members in register extending therefrom.

12. A game call amplifying call holder device comprising:
   a concave member with an interior surface and an exterior surface, the interior surface including a base surface and upward sloping side surface;
   a pair of parallel rail members of selected length positioned within the concave member, each rail member elevated a selected distance above the base surface by a pair of spaced apart support members attached thereto, each rail member having a retaining flange member extending along the selected length of the rail member on a top side thereof;
      a biasing member extending along the selected length of each rail member adjacent to and beneath the retaining flange member;
      a stop member connected between adjacent ends of the parallel rail members below the retaining flange members;
      a bridge member connected between adjacent ends of the parallel rail members atop the retaining flange members and opposite the stop member;
      said rail members with flange member and biasing member positioned and adapted to reversibly secure at least one planar call device there between, the planar call device secured on opposite edges between the flange member and the biasing member of each rail member, the planar call member inserted between the parallel rail members from the rail adjacent ends opposite the stop member, whereby the flange members and biasing members allows the planar call device to vibrate when activated with a striker, with the concave member reflecting and amplifying vibrations thus produced.

13. The amplifying call holder device according to claim 12 wherein, the concave member includes a rectangular concave member and a planar base surface.

14. The amplifying call holder device according to claim 12 wherein, the biasing member of the rail members includes a V-shaped member with a point of the V-shaped member adjacent and beneath the retaining flange member.

15. The amplifying call holder device according to claim 12 wherein, the spaced apart support members of one rail member are of a length different than the spaced apart support members of the other rail member.

16. The amplifying call holder device according to claim 12 wherein, the rail members with flange member and biasing member are sized to accept two planar call devices.

17. The amplifying call holder device according to claim 12, further comprising a support clip member secured to the exterior surface of the concave member adjacent one end thereof.

18. The amplifying call holder device according to claim 17 wherein, the support clip member includes an anchoring attachment portion with first and second blade members in register extending therefrom.

19. A game call amplifying call holder device comprising:
   a concave rectangular member with an interior surface and an exterior surface, the interior surface including a planar base surface and upward sloping side surface;
   a pair of parallel rail members of selected length positioned within the concave member, each rail member elevated a selected distance above the planar base surface by a pair of spaced apart support members attached thereto, each rail member having a retaining flange member extending along the selected length of the rail member on a top side thereof;
      a biasing member extending along the selected length of each rail member adjacent to and beneath the retaining flange member, the biasing member including a V-shaped member with a point of the V-shaped member adjacent and beneath the retaining flange member;
      a stop member connected between adjacent ends of the parallel rail members below the retaining flange members;
      a bridge member connected between adjacent ends of the parallel rail members atop the retaining flange members and opposite the stop member;
      said rail members with flange member and biasing member positioned and adapted to reversibly secure at least one planar call device there between, the planar call device secured on opposite edges between the flange member and the biasing member of each rail member, the planar call member inserted between the parallel rail members from the rail adjacent ends opposite the stop member, whereby the flange members and biasing members allows the planar call device to vibrate when activated with a striker, with the concave member reflecting and amplifying vibrations thus produced.

20. The amplifying call holder device according to claim 19 wherein, the rail members with flange member and biasing member are sized to accept two planar call devices.

21. A game call amplifying call holder and game call assembly comprising:
   a concave member with an interior surface and an exterior surface, the interior surface including a base surface and upward sloping side surface;
   a pair of parallel rail members of selected length positioned within the concave member, each rail member elevated a selected distance above the base surface by a pair of spaced apart support members attached thereto, each rail member having a retaining flange member extending along the selected length of the rail member on a top side thereof;
      a biasing member extending along the selected length of each rail member adjacent to and beneath the retaining flange member, the biasing member including a V-shaped member with a point of the V-shaped member adjacent and beneath the retaining flange member;
      a stop member connected between adjacent ends of the parallel rail members below the retaining flange members;
      a bridge member connected between adjacent ends of the parallel rail members atop the retaining flange members and opposite the stop member;
      a planar call device secured on opposite edges between the flange member and the biasing member of each rail member, the planar call member reversibly inserted between the parallel rail members from the rail adjacent ends opposite the stop member;
      whereby the flange members and biasing members allows the planar call device to vibrate when activated with a striker, with the concave member reflecting and amplifying vibrations thus produced.

22. The amplifying call holder device according to claim 21 wherein, the rail members with flange member and biasing member are sized to accept two planar call devices.

23. The amplifying call holder device according to claim 21 wherein, the planar call device is a circular planar call device.

* * * * *